United States Patent [19]

Benedict

[11] Patent Number: 4,533,400

[45] Date of Patent: Aug. 6, 1985

[54] METHOD AND APPARATUS FOR LASER HARDENING OF STEEL

[75] Inventor: Gary F. Benedict, Chandler, Ariz.

[73] Assignee: The Garrett Corporation, Los Angeles, Calif.

[21] Appl. No.: 509,530

[22] Filed: Jun. 29, 1983

[51] Int. Cl.³ ............................................. B23K 27/00
[52] U.S. Cl. ...................................... 148/4; 148/147; 219/121 LT
[58] Field of Search ................. 148/4, 152, 145, 147; 219/121 LT, 121 LR, 121 LS; 350/274

[56] References Cited

U.S. PATENT DOCUMENTS

| | | | |
|---|---|---|---|
| 2,494,440 | 1/1950 | Haynes | 350/274 |
| 3,303,739 | 2/1967 | Chitayat | 350/274 |
| 3,813,146 | 5/1974 | Burch et al. | 350/274 |
| 4,250,372 | 2/1981 | Tani | 219/121 LT |
| 4,250,374 | 2/1981 | Tani | 219/121 LT |
| 4,404,452 | 9/1983 | Cashwell | 219/121 LT |
| 4,404,454 | 9/1983 | Taylor et al. | 219/121 LT |

FOREIGN PATENT DOCUMENTS 0048208  8/1982  Japan ..................... 148/147

OTHER PUBLICATIONS

*American College Dictionary*, Barnhart et al., p. 850, 12/70.

*Primary Examiner*—L. Dewayne Rutledge
*Assistant Examiner*—S. Kastler
*Attorney, Agent, or Firm*—Leslie S. Miller; Albert J. Miller

[57] ABSTRACT

An apparatus and method is disclosed whereby a high power laser beam is mechanically split into two substantially identical beams which are focused and directed onto opposite working surfaces of a workpiece to simultaneously harden both working surfaces, thereby preventing back-temper.

31 Claims, 6 Drawing Figures

METHOD AND APPARATUS FOR LASER HARDENING OF STEEL

BACKGROUND OF THE INVENTION

High quality steel products such as spur gears for aerospace applications require that the gear surface making contact with other gears be hardened to minimize wear, while the interior portion of the gear must remain unhardened in order to prevent the gear from becoming brittle, shock-susceptible, and subject to breakage. The typical industrial process for manufacturing high quality gears requires either case carburizing and hardening, or induction hardening, of the gear teeth to a specified contour, case depth, and hardness.

Carburizing introduces carbon into the surface layer of a low-carbon steel by heating the part in a furnace while it is in contact with a carbonaceous material. The carbon diffuses into the steel from the surface and converts the outer layer of the part into high-carbon steel. The part is then removed from the furnace, allowed to cool, and is heat-treated be being brought to a high temperature above the transformation point and quickly quenched, transforming the high-carbon surface layer into a hard case containing martensite, while leaving the low-carbon core tough and shock-resistant. Quenching involves a rapid cooling of the heated surfaces either conventionally by a gas or a liquid, or by the heat sink effect of the part's mass (not possible where the part is heated in a furnace).

Carburizing requires selective masking of the part, as well as subsequent chemical mask removal, to prevent surface portions of the part which must remain non-hardened from becoming hardened in the carburizing process. The quenching step produces distortion in the part, which will then invariably require a final grinding operation to correct the distortion, particularly in gears destined for use in aerospace applications, which are required to be of extremely high quality and have critical tolerances.

In the manufacturing of such high quality gears, quenching dies may be used to minimize distortion during the quenching operation. The gear being hardened is heated above the transformation temperature, and is placed into a quenching die fitting the part perfectly. The quenching operation is then performed, and the part may be removed from the quenching die.

Thus, it can be seen that the carburizing method of hardening is both energy and labor intensive, and is therefore quite expensive. In addition, the carburizing technique is quite time-consuming and requires a large amount of equipment, including a furnace, quenching dies must be custom made for each part being manufactured, masking equipment, and regrinding equipment.

An alternative to carburizing is induction hardening, where the part to be hardened is placed inside a coil through which a rapidly alternating current is flowing. Heat is rapidly generated within localized portions of the part by electromagnetic induction, which the depth of the case being controlled by the frequency of the current in the coil. The part is then quenched, and induction hardening thus also presents the problem of distortion in the part which will subsequently require final regrinding operations. As such, induction hardening is also expensive and time-consuming.

Due to their unique properties, industiral lasers have shown great promise in selective rapid heating of a surface. The surface is generally prepared by applying an absorptive coating to the surface to be heated, aiding in energy transfer from the laser beam to heat energy within the part. By using a laser to quickly heat a surface, conventional quenching by a gas or a liquid is unnecessary since only the shallow surface area itself is heated. The part will actually self-quench, due to the extremely high heat differential between the shallow surface layer heated by the laser and the bulk of the part being processed. This is in sharp contrast to carburizing or induction heating, where the part must be heated in one operation, and then is required to be quickly quenched by a gas or a liquid.

Attempts have been made in the past to use industrial lasers for surface heat treatment of parts such as gears, and two such attempts are described in U.S. Pat. Nos. 4,250,372 and 4,250,374, both to Tani, The '374 patent describes the technique of gear hardening using a single beam, and the '372 patent describes a technique using two or more beams to obtain more even heating of the gear tooth areas to be hardened.

Both of these patents, however, have one thing in common which renders them largely impractical—they seek to harden a gear by hardening a V-shaped area including the flank or side of one gear tooth, the flank of an adjacent gear tooth, and the root area between the two gear teeth at one time, and then move on to an adjacent V-shaped area. The problem with such an approach is that when one flank of a gear tooth is hardened in one operation, and the opposite flank of the gear tooth is hardened in a second operation, sufficient heat is generated in the gear tooth when the second flank is hardened to substantially diminish the hardness in a portion of the first flank. This problem, which presents itself in the hardening of all but very coarse gears, is referred to as back-temper, since it heats and softens a surface which has already been hardened.

Therefore, it can be seen that although the '372 and the '374 patents do provide desireable alternatives to carburizing, the alternative presented is impractical on all but very coarse gears. Since a great number of the high quality aerospace spur gears manufactured are considerably smaller than the size which can be manufactured by the process described in the '372 and the '374 patents, it can seen that these patents simply do not present a viable, broadranging alternative to carburizing and hardening of gears.

Additionally, the beam splitting device shown in the '372 patent has been found to be prone to differences in the two beam intensities caused by extremely small dimensional errors, causing inconsistent heating of the areas heated by the two beams. The use of two discrete laser sources is too expensive and requires too large an installation to be practical. Thus, it can be seen that if lasers are to be used for surface hardening of parts such as gears, a new method and/or apparatus for hardening gears which eliminates the back temper problem must be achieved.

SUMMARY OF THE INVENTION

The present invention utilizes a beam alternating device which precisely splits a single laser beam into two identical beams, and focuses and aims the beams at both flanks of a single gear tooth. By hardening both flanks of a single gear tooth in one operation, back tempering of the gear tooth is completely eliminated as a problem. Surface heat absorption problems such as heat build-up in a portion of the part are eliminated by hardening every third or so tooth in the gear, and by making subsequent passes around the gear to harden all the gear teeth.

By utilizing a split beam, several advantages are obtained. First, the portions of the beam can be more precisely timed at the gear tooth. Secondly, the portions of the beam can approach the surface of the gear in a direction which allows for the surface of the gear tooth to be more uniformly hardened.

The only surfaces hardened by the carburizing process which are not hardened by the present laser hardening process are the root area between adjacent gear teeth and the tooth tips of the gear teeth. However, the softer root area between the gear teeth will be fairly narrow, and is non-critical in most applications since the root area is not a load-bearing area of the gear, and the tooth-tips are non-functional areas of the gear teeth.

The beam alternating device itself is constructed by using a rotatable beam alternator wheel which has apertures making it 50% porous. Therefore, when a laser beam is directed toward the surface of the beam alternator wheel, 50% of the laser beam will pass through the wheel. The surface of the wheel facing the laser beam souce is polished and coated with a highly reflective coating material so the 50% of the beam which does not pass through the apertures in the wheel will be reflected off of the wheel. By directing the laser beam from the source to the wheel at an angle, two identical beams are thusly obtained, one passing through the apertures in the wheel, and the other being reflected off of the wheel.

Both beams then pass through focusing lenses and positioning mirrors and are directed onto the surface of a gear tooth, one beam striking one flank of the same gear tooth, and the other beam striking the opposite flank of the gear tooth. The beams are caused to axially traverse each gear tooth to afford full coverage of the tooth area.

Such a device and method has a number of striking advantages. First of all, a large amount of the energy required in the carburizing operation is simply not required in the laser hardening operation since only the surface to be hardened is heated, and not the entire gear. Secondly, since only the surface to be hardened is heated, there is virtually no distortion whatsoever present in the laser hardening process, thus completely eliminating the need for regrinding to correct distortion.

Finally, the process utilizing laser hardening is extremely, quick, and may be performed in a single operation, thus tremendously reducing the amount of time and labor required. Laser gear hardening is simply much cheaper than carburizing, nitriding or induction hardening—in fact, it has been found that by using the technique disclosed herein, costs of manufacturing high quality gears may be reduced by 40%.

The present method of laser gear hardening has tremendous advantages over earlier techniques involving use of lasers. There is no back-temper problem, as was unavoidably present in the methods disclosed by the '372 and the '374 patents.

The beam splitting technique disclosed herein also represents a high quality method of splitting a high power laser beam into two identical beams, since laser beams are rarely symmetric. Also, the technique disclosed here is not sensitive to varying input beam angles, as are transmissive beam splitters. Earlier methods, such as using a reflective pyramid to divide a beam, were simply not practical because the characteristic of the beams obtained had been altered—the coherent beam was no longer of uniform strength, and the two beams obtained, in fact, often were not identical but rather differed in total energy content by several percent.

Another tremendous advantage of the present technique is that virtually any surface can be hardened without the requirement for an extensive setup requiring a long lead time and large investment in nonreusable machinery. The beam splitter disclosed herein may be adjusted for various types of gears quickly and simply, and in fact the entire apparatus may be mounted on a computer controlled machine. In such an application, a high volume of perfectly hardened gears may be manufactured with virtually no lead time required for the operation. A single machine could, in fact, be utilized to harden a variety of different gears. Thus, it can be seen that the present apparatus and technique represents a great improvement over previously known methods in that it substantially reduces costs, lead time, energy requirements, and labor requirements, while simultaneously increasing product quality and uniformity.

DESCRIPTION OF THE DRAWINGS

These and other advantages of the present invention are best illustrated through reference to the drawings, in which.

DETAILED DESCRIPTION OF THE PREFERRED EMBODIMENT

Figure 1:
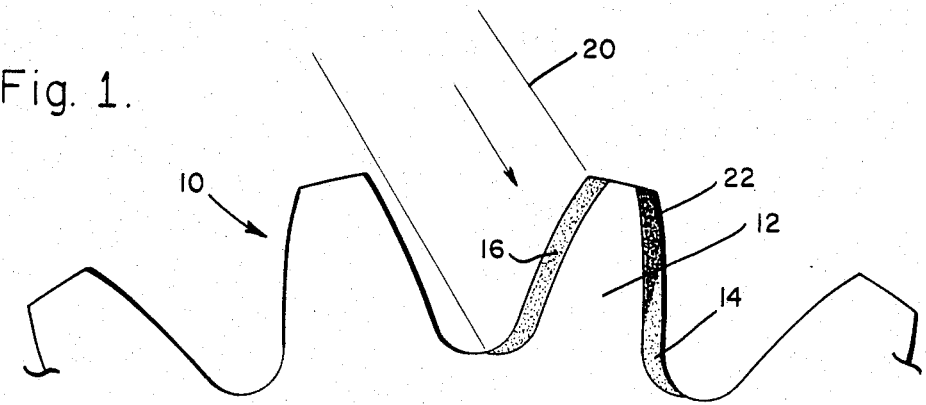
FIG. 1 represents a previously known technique of gear hardening by laser in which a single beam is used to harden a gear tooth one flank at a time.

In order to best understand and appreciate the advantages of the present invention, a brief discussion of past attempts to use a laser for surface hardening of a mechanical part such as a gear is helpful. In FIG. 1, several teeth of a gear 10 are shown, with the technique used to harden a tooth 12 on the gear 10 being that of using a single laser beam to harden the gear one gear tooth flank at a time. The right flank 14 of the gear tooth 12 has been hardened in a previous step, and in FIG. 1 the left flank 16 of the gear tooth 12 is being hardened by having a laser beam 20 directed at the left flank 16. Unless the gear 10 is fairly coarse, the heat generated by the laser beam 20 in hardening the left flank 16 of the gear tooth 12 will cause a back-temper to occur on an area 22 comprising a portion of the previously hardened right flank 14 of the gear tooth 12. As a result, this back-tempered area 22 will no longer have the desired hardness, and will be prone to excessive wear, even in normal rather than highly destructive work environments. Thus, it is apparent that the technique shown in FIG. 1 of hardening a gear one gear tooth flank at a time will not produce a satisfactory product.

Figure 2:
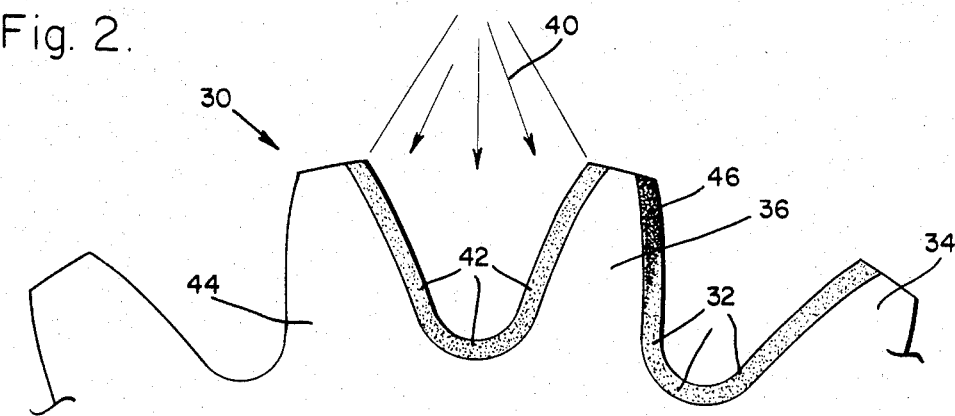
FIG. 2 shows a technique of laser gear hardening in which either a single beam or multiple beams are used to harden a V-shaped area including the flank of one gear tooth, the root area between that tooth and the adjacent tooth, and the adjoining flank of the adjacent tooth.

In FIG. 2, a more sophisticated gear tooth hardening technique is shown, the technique being that disclosed in U.S. Pat. No. 4,250,374, to Tani. This technique involves hardening the entire V-shaped valley of a gear 30 at a time, and is the same basic type of approach as that taken in U.S. Pat. No. 4,250,372, also to Tani. In the step prior to the step being illustrated in FIG. 2, a V-shaped valley area 32 between a first gear tooth 34 and a second gear tooth 36 has been hardened by directing a laser beam onto the V-shaped area 32.

In FIG. 2, a laser beam 40 is directed onto a second V-shaped valley area 42 between the second gear tooth 36 and a third gear tooth 44. While the area 42 between the second gear tooth 36 and the third gear tooth 44 will be hardened by the heat generated by the laser beam 40 and the subsequent self-quench cooling of the area 42, the heat generated will cause a back-temper area 46 in the V-shaped valley area 32 previously hardened. The back-temper area 46 will not have the proper hardness characteristics because of the back temper phenomena. Thus, it can be seen that the technique illustrated in FIG. 2, and disclosed in the two above-identified U.S. patents, also does not give a final product of sufficiently high quality, particularly in fine pitch gear applications.

Figure 3:
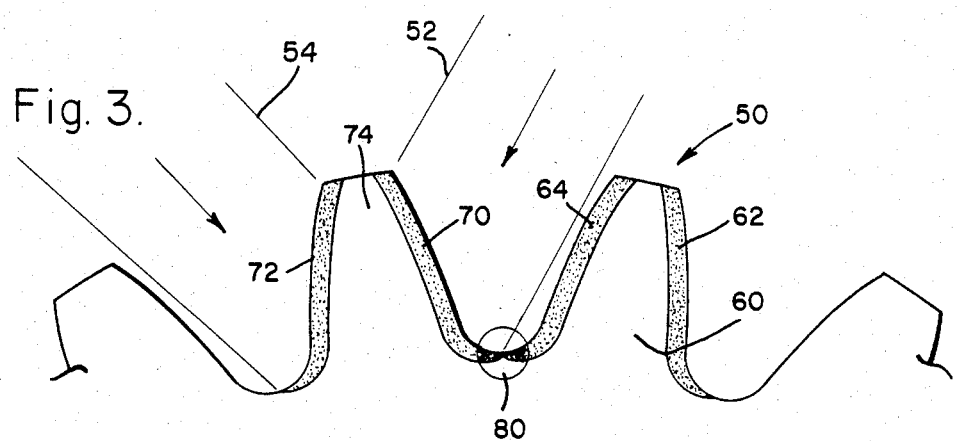
FIG. 3 shows the present technique being used to simultaneously harden both flanks of a gear tooth.

The present invention uses the approach illustrated in FIG. 3, which shows a portion of a gear 50 being hardened by the application of a first laser beam 52 and a second laser beam 54. In a previous step, a first gear tooth 60 has had both its right flank 62 and its left flank 64 hardened by application of the twin laser beams 52 and 54.

In the step being shown in FIG. 3, the twin laser beams 52 and 54 are directed to the right flank 70 and the left flank 72 of a second gear tooth 74. Since both flanks of the gear tooth 74 are being heated by the laser beam 52, 54 simultaneously, there will be no back-temper in either the right flank 70 or the left flank 72; rather, both flanks 70, 72 will be properly hardened. External air or water quenching are unnecessary on all but very fine gears.

The only area in which there exists the possibility of back-temper occurring is the root area 80 between the first gear tooth 60 and the second gear tooth 74, in which heating of the right flank 70 of the second gear tooth 74 by the laser beam 52 may cause a back-temper area 80 to occur in a small portion of the area hardened on the left flank 64 of the first gear tooth 60. However, it is important to note that the root area 80 in which any possible back-temper could occur is not a critical area of the gear in most applications, inasmuch as the root of the gear is not a mechanically contacting surface, and since the loading on a gear occurs on the flanks of the gear teeth.

Therefore, it can be seen that the ideal way to harden the teeth on a gear is to simultaneously direct twin beams onto both flanks of a gear tooth, thus hardening both flanks of each tooth in a single operation to avoid any back tempering of the critical hardened areas. There are several ways in which twin beams could be directed at a gear tooth. The first possible solution is to use two lasers.

Such a technique has significant drawbacks, such as the prohibitive costs and size requirements that having two separate laser light sources would engender. An additional problem is that the twin laser beams 52 and 54 must be as close to identical as is physically possible, in order to produce hardened flank areas on the gear teeth which are of uniform contour, case depth, and hardness. It is apparent that it would be easier to obtain two beams having identical characteristics by perfectly splitting a single beam into a pair of beams.

Such an approach has been tried in the past, with the beam splitter being a highly polished pyramid-shaped divider. With such a mechanical beam splitter, the alignment of the center point of the mechanical divider in the laser beam is critical, with even an extremely small error causing fairly significant difference in the characteristics of the two beams obtained. Thus, such an approach is likely to be of laboratory interest only, since the harsh realities of the manufacturing world dictate against the type of precision which would be necessary for such a device to operate properly.

With this technical background, the present invention was designed to be a solution to the problems described above, and will, in fact, provide the twin laser beams 52 and 54 as shown in FIG. 3.

Figure 4:
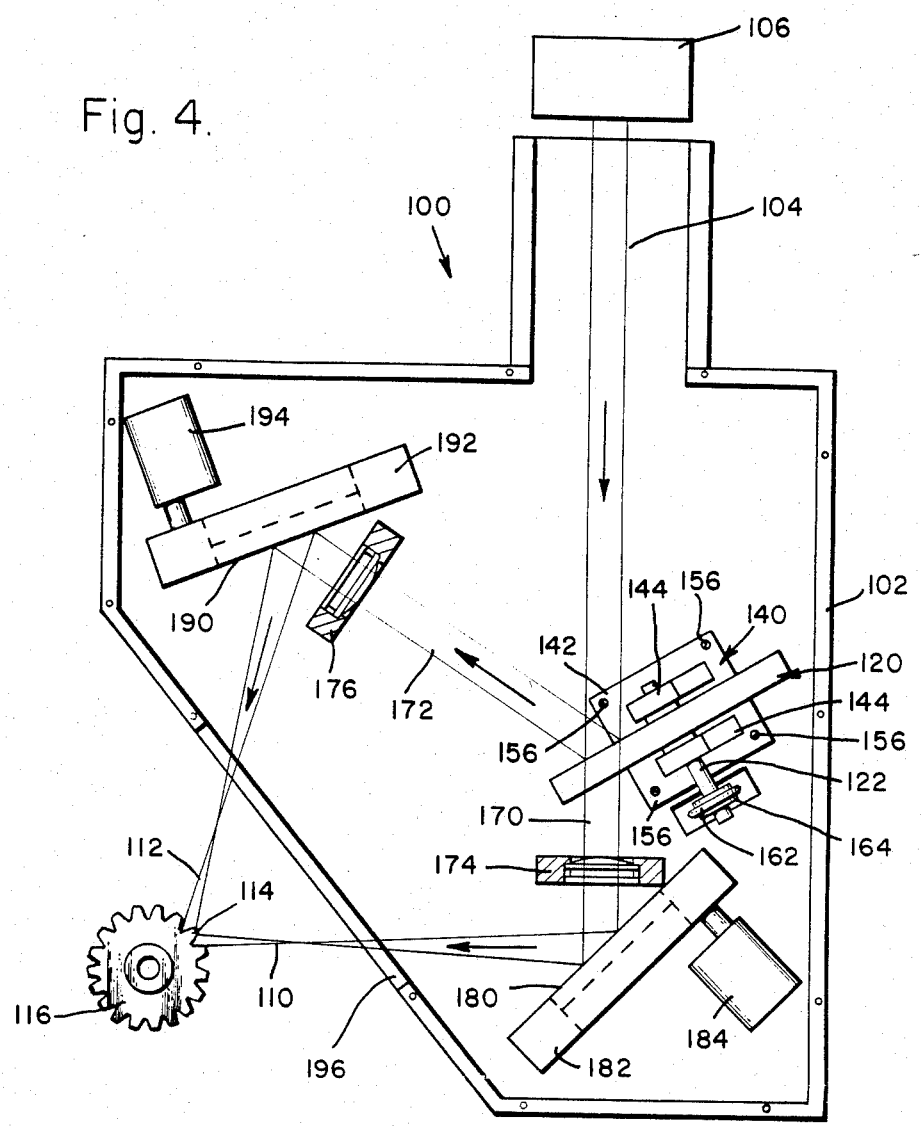
FIG. 4 shows the beam alternating apparatus, and the focusing and directing apparatus used to provide the twin laser beams hardening the gear tooth as shown in FIG. 3.

In FIG. 4, the beam alternator 100 which is the preferred embodiment of the present invention is illustrated. The beam alternator has a housing 102 in which are mounted the components necessary to split, focus, and direct an incoming laser beam 104 from a laser source 106 into twin outgoing laser beams 110 and 112, which are directed onto the flanks of a tooth 114 of a gear 116 to harden the surface areas of the tooth 114.

Figure 6:
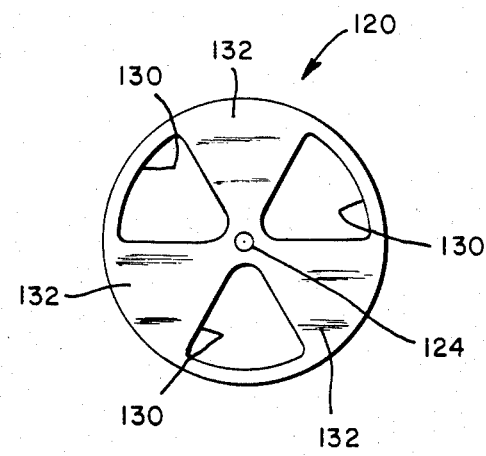
FIG. 6 shows the alternator wheel of the device shown in FIG. 4.

The incoming laser beam 104 from the laser source 106 is directed onto a rotating alternator wheel 120, which is best shown in FIG. 6. The alternator wheel 120 is fixedly mounted on a shaft 122 through the center 124 of the alternator wheel 120. As shown in FIG. 6, the alternator wheel 120 of the preferred embodiment has three apertures 130 therein, separated by solid areas 132. Any concentric circle drawn around the center 124 of the wheel 120 would have virtually equal portions lying in the aperture areas 130 and the solid areas 132.

The solid areas 132 of the alternator wheel 120 are highly polished to a mirror-like surface, and are either plated with a highly reflective material such as gold or silver, or the wheel 120 may be fabricated of copper, tungsten, or molybdenum. Practically speaking, since the reflective material will absorb an extremely small amount (i.e. 1–2%) of the laser beam 104, the portion of the apertures contained in any of the above-described concentric circles will actually be slightly smaller than the portion of the solid areas 132 lying within the concentric circles. When the alternator wheel 120 is rotated in the path of the laser beam 104, two precisely equivalent laser beams will be generated, one beam 170 passing through the apertures 130 of the alternator wheel, and a second beam 172 being reflected from the solid areas 132 of the alternator wheel 120.

Figure 5:
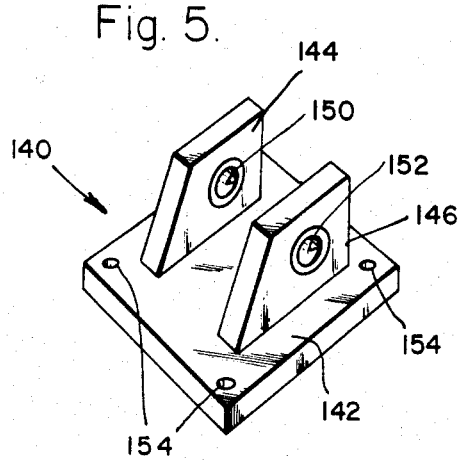
FIG. 5 shows the alternator support apparatus for the beam alternating wheel of FIG. 4.

The alternator 120, fixedly mounted on the shaft 122, is rotatably mounted in an alternator support assembly 140, best shown in FIG. 5. The alternator support assembly is comprised of a base portion 142, and arm portions 144 and 146, the arm portions 144 and 146 have bearings 150 and 152, respectively, mounted therein. Thus, it can be seen that the alternator wheel 120 and the shaft 122 will freely rotate within the bearing assemblies 150 and 152 mounted in the alternator support assembly 140. The base 142 of the alternator suport assembly 140 has a number of holes 154 therein, through which bolts 156 are used to fixedly mount the alternator support assembly 140 in the housing 102.

The alternator wheel 120 is rotated by a motor 160 (not shown) via a drive belt 162 located in a pulley 164 mounted at one end of the shaft 122. The motor 160 causes the alternator wheel 120 to be driven at a fairly high speed (not less than 1000 RPM).

Thus, it can be seen that the incoming laser beam 104 from the laser source 106 will be split into two identical beams 170 and 172, with the beam 170 passing through the alternator wheel 120 and the beam 172 being reflected off of the reflective surfaces on the alternator wheel 120. The beams 170, 172 then pass through focusing lenses, with the beam 170 passing through a focusing lens 174, and the beam 172 passing through a focusing lens 176. The focusing lenses can be either spherical (to produce a round converging beam), cylindrical (to produce a line-shaped converging beam), or a combination of spherical and cylindrical (to produce a converging line-shaped variable length beam), with the last type of lenses being preferred.

The beams 170, 172 then travel beyond the focusing lenses 174, 176, respectively, to flat mirrors mounted on computer controlled gimbal mounts. The beam 170 will be reflected off of a mirror 180 mounted in a gimbal mount 182 which is positioned by a gimbal mount motor 184. The beam 172 will be reflected off of a mirror 190, which is mounted in a gimbal mount 192, which is, in turn, driven by a gimble mount motor 194. The gimbal mount motors 184 and 194 may be computer-controlled to allow rapid repositioning of the beams to accommodate different gear geommetries.

The beams 170 and 172 are thusly directed out of the housing 102 through an aperture 196, and are directed onto a gear tooth 114 as beams 110 and 112, respectively. The beams 110 and 112 are thus focused, directed, specifically positioned beams which typically produce a power density of between 1,000 and 100,000 watts per square inch on the flank surfaces of the gear tooth 114.

The gear is then axially traversed with the laser beams 110, 112 to afford full coverage of the gear tooth 114. Typically, it is easier to move the gear 116 axially than to cause the beams 110 and 112 to axially traverse the gear tooth, since the latter would require a moving laser light source 106. It should be noted that laser power must be terminated approximately one-eighth inch from the end of the gear 116 to avoid melting the corner of the tooth 114. Full hardening at the ends occurs by thermal conduction of the residual heat. Thus, the gear 116 can be properly positioned, with the laser source being turned on and the traverse of the gear 116 beginning simultaneously. The entire operation can be computer-controlled, with the setup for each gear being easily programmable into existing computer control systems.

It is also worth noting that in order to avoid back temper from occurring, in the preferred method only every third tooth of the gear 116 is treated in a single gear rotation. Then, in a subsequent gear rotation pass, the second third of the gear teeth are done, and in a final pass, the other third of the gear teeth are treated. By not doing each gear tooth in turn, excessive heat buildup in a small area of the gear is avoided, and all back-tempering problems in the flank surfaces of the gear teeth are eliminated. Self-quenching is satisfactory in cooling the gear teeth when this technique is followed, with only very fine gears requiring quench assistance from air or water.

Thus, it can be seen that the present invention allows for a hardening operation to be performed on gears without requiring the excessive energy and labor requirements and setup costs required in the carburizing and hardening operation. The hardening operation described herein is also applicable to other parts, such as bearings. While the arrangement described herein for the beam alternator 100 is the preferred embodiment, it is noteworthy that the optical system incorporated therein could be modified in several ways to produce the same results. For example, the flat mirrors could be replaced with focusing mirrors, thus eliminating the lenses; the lenses could also be placed in the optical path after the mirrors.

In the practice of the present invention in hardening surfaces such as gear teeth, the problems existing in past techniques have all been eliminated without the incurring of any substantial disadvantages. The high labor and energy costs of carburizing and hardening or induction hardening need not be incurred, and in fact it has been found that the overall cost of manufacturing high quality gears can be reduced by 40% by practicing the present invention. The significance of such cost savings is even greater when it is realized that the present apparatus and method produce extremely high quality hardened surfaces of a specific contour, case depth, hardness, and repeatability. Thus, high quality components can be manufactured quicker and cheaper by utilizing the present invention.

What is claimed is:

1. A method of simultaneously hardening both sides of a gear tooth or other projection from a workpiece, comprising:

supplying a high power laser light beam;

periodically interposing at a high repetition rate a mechanical obstruction to substantially interrupt said high power laser light beam, said periodic interruption allowing the uninterrupted portion of said laser light beam to pass in a first optical path;

providing a reflective surface on said mechanical obstruction to direct the interrupted portion of said high power laser light beam in a second optical path, said interposing step being performed so as to cause the intensities of light in said first and second optical paths to be substantially identical;

directing light from said first optical path onto one side of said gear tooth or other projection from said workpiece at a first end of said gear tooth or other projection from said workpiece;

focusing said light from said first optical path directed onto said one side of said gear tooth or other projection from said workpiece into a first coherent beam of a desired intensity and cross-sectional geographic configuration;

directing light from said second optical path onto the other side of said gear tooth or other projection from said workpiece at said first end of said gear tooth or other projection from said workpiece;

focusing said light from said second optical path directed onto said other side of said gear tooth or other projection from said workpiece into a second coherent beam of a desired intensity and cross-sectional geographic configuration; and traversing said one side of said gear tooth or other projection from said workpiece from said one end to the other end with said first coherent beam while simultaneously traversing said other side of said gear tooth or other projection from said workpiece from said one end to said other end with said second coherent beam.

2. A method as defined in claim 1, wherein said interposing step comprises:

rotating a wheel having at least one aperture at high speed, said wheel located in the path of said high power laser light beam, said aperture allowing said laser beam to pass through said wheel into said first optical path when said wheel is angularly positioned in a first manner, said reflective surface being located on the portion of said wheel not containing said aperture and oriented in the path of said laser beam, said reflective surface directing said laser beam into said second optical path when said wheel is angularly positioned in other than said first manner.

3. A method as defined in claim 2, wherein said wheel is constructed of copper, tungsten, or molybdenum.

4. A method as defined in claim 1, wherein said reflective surface is gold or silver plated.

5. A method as defined in claim 1, wherein said directing light from said first optical path step comprises:

orienting a mirror in said first optical path to cause laser light in said path to be transmitted to a desired location on said one side of said gear tooth or other projection from said workpiece; and positioning said mirror with a computer-controlled motor to allow for varying sizes of workpieces to be processed.

6. A method as defined in claim 1, wherein said directing light from said second optical path step comprises:

orienting a mirror in said second optical path to cause laser light in said path to be transmitted to a desired location on said other side of said gear tooth or other projection from said workpiece; and positioning said mirror with a computer-controlled motor to allow for varying sizes of workpieces to be processed.

7. A method as defined in claim 1, wherein said focusing said light from said first optical path step comprises:

positioning both a cylindrical lens and a spherical lens in said first optical path, said cylindrical lens and said spherical lens being located so as to focus laser light on said one side of said gear tooth or other projection from said workpiece in a converging, line-shaped variable length beam.

8. A method as defined in claim 1, wherein said focusing said light from said second optical path step comprises:

positioning both a cylindrical lens and a spherical lens in said second optical path, said cylindrical lens and said spherical lens being located so as to focus laser light on said other side of said gear tooth or other projection from said workpiece in a converging, line-shaped variable length beam.

9. A method as defined in claim 1, wherein said focusing and directing steps are simultaneously performed by a focusing mirror.

10. A method as defined in claim 1, wherein said traversing step terminates when said first and second coherent beams are a short distance away from said other end of said gear tooth or other projection from said workpiece to avoid melting the edge of said gear tooth or other projection from said workpiece at said other end.

11. A method as defined in claim 1, wherein said supplying step begins at the time said traversing step begins, and ends when said traversing step ends.

12. A method as defined in claim 1, including the additional preparatory step comprising:

coating the surfaces to be hardened with a light absorbing material to facilitate energy transfer from said first and second coherent beams into said workpiece.

13. A method of simultaneously hardening a first face and a second face of a projection from an object, wherein said second face is on an opposite side of said projection from said first face, comprising:

providing a laser light beam;

periodically mechanically interrupting said laser light beam to allow a first portion of said laser light beam to pass the point of said periodic mechanical interruption;

reflecting the portion of said laser light beam mechanically interrupted to obtain a second portion of said laser light beam, said second portion and said first portion being of substantially identical intensity;

focusing and directing said first portion of said beam onto said first face of said projection from said object;

focusing and directing said second portion of said beam onto said second face of said projection from said object; and traversing said first and second faces of said projection from said object with said first and second portions of said beam, respectively, to heat the surface areas of said first and second faces as they are traversed.

14. A method as defined in claim 13, wherein said projection from said object is a tooth on a gear, said first face is one working surface of said gear tooth, and said second face is the other working surface of said gear tooth.

15. A method as defined in claim 14, wherein all of said aforesaid steps are repeated to harden multiple teeth located on said gear.

16. A method as defined in claim 15, wherein every second or third tooth is hardened in series, the skipping of teeth preventing heat buildup in a portion of said gear, the teeth skipped being hardened in subsequent rotations of said gear.

17. A method of hardening a tooth projecting from a gear, comprising:

providing a high intensity laser beam;

splitting said laser beam into two substantially identical beams;

directing said two substantially identical beams onto opposite sides of said tooth projecting from said gear to harden said tooth projecting from said gear without causing back-temper in the working surfaces of any of the teeth on said gear.

18. A method of hardening teeth on a gear, comprising:

providing a first laser light beam;

splitting said first laser light beam into a second laser light beam and a third laser light beam by selectively, periodically interrupting the optical path of said first laser light beam, said second and third laser light beams being of substantially identical intensity;

focusing and directing said second laser light beam onto one side of a gear tooth on said gear;

focusing and directing said third laser light beam onto the other side of said gear tooth on said gear; and traversing said gear tooth with said second and third laser light beams to uniformly heat the wearing surfaces of said gear tooth.

19. A method of hardening teeth on a gear, comprising:

providing a laser light beam of high intensity;

interposing into the path of said laser light beam a rotating wheel, said wheel having apertures located therein, said apertures allowing a first portion of said beam to pass therethrough, the surface of said wheel facing said beam having a highly reflective surface in the areas between said apertures to cause a second portion of said beam to be reflected therefrom, said first and second portions of said beam having substantially identical intensities;

focusing and directing said first portion of said beam onto one side of a gear tooth on said gear; and focusing and directing said second portion of said beam onto the other side of said gear tooth on said gear.

20. A device for simultaneouly hardening both sides of a gear tooth projecting from a gear using a laser light source, comprising:

mechanical obstruction means for periodically interrupting at a high repetition rate a high power laser light beam from said laser light source, said mechanical obstruction means thereby allowing a portion of said laser light beam to pass in a first optical path;

reflective surface means located on said mechanical obstruction means for reflecting the interrupted portion of said laser light beam into a second optical path, the configuration of said mechanical obstruction means and said reflective surface means causing the portions of said laser light beams entering said first and second optical paths to be substantially identical;

first directing means for directing light from said first optical path onto one side of a first end of said gear tooth projecting from said gear;

first lens means for focusing light from said first optical path into a first coherent beam of desired intensity and cross-sectional geographic configuration at the point said light from said first optical path intersects said one side of said gear tooth projecting from said gear;

second directing means for directing light from said second optical path onto the other side of said first end of said gear tooth projecting from said gear;

second lens means for focusing light from said second optical path into a second coherent beam of desired intensity and cross-sectional configuration at the point said light from said second optical path intersects said other side of said gear tooth projecting from said gear; and means for causing relative movement between said gear tooth projecting from said gear and said first and second optical paths so that said first and second coherent beams simultaneously traverse said one side and said other side respectively of said gear tooth projecting from said gear from said one end to the other end.

21. A device as defined in claim 20, wherein said mechanical obstruction means comprises:

a rotating wheel with at least one aperture therein, said wheel interposed in front of said high power laser light to allow said laser light beam to pass through said aperture when said wheel is in a first angular position, said laser light beam passing through said aperture into said first optical path.

22. A device as defined in claim 21, wherein said reflective surface means comprises:

a smooth, highly polished face located on the surface of said rotating wheel facing the origin of said high powered laser light beam, said highly polished face interrupting and reflecting said laser light beam into said second optical path when said wheel is in a second angular position.

23. A device as defined in claim 22, wherein said smooth, highly polished face is plated with a highly reflective material selected from the group consisting of gold and silver.

24. A device as defined in claim 21, wherein said wheel is fabricated of copper, tungsten, or molybdenum.

25. A device as defined in claim 21, wherein said rotating wheel includes multiple apertures and is driven at a speed of at least 1000 RPM.

26. A device as defined in claim 20, wherein said first directing means comprises:

a mirror surface selectively positioned to direct laser light from said first optical path onto said gear tooth projecting from said gear, said mirror being moveable to accommodate gears of different sizes.

27. A device as defined in claim 20, wherein said second directing means comprises:

a mirror surface selectively positioned to direct laser light from said second optical path onto said gear tooth projecting from said gear, said mirror being moveable to accomodate gears of different sizes.

28. A device as defined in claim 20, wherein said first lens means comprises, in combination, a cylindrical lens and a spherical lens, to produce a converging line-shaped variable length beam on said gear tooth projecting from said gear.

29. A device as defined in claim 20, wherein said second lens means comprises, in combination, a cylindrical lens and a spherical lens, to produce a converging line-shaped variable length beam on said gear tooth projecting from said gear.

30. A device for laser hardening a gear tooth projecting from a gear, comprising:

a rotating wheel with apertures therein positioned in the path of a high intensity laser light beam from said laser, a first portion of said beam passing through said apertures, a second portion of said beam being reflected off of the surface areas of said wheel separating said apertures, said first and second portions of said beam being of substantially identical intensity;

means for focusing and directing light from said first and second portions of said beam onto a first side and a second side of a single gear tooth projecting from said gear, respectively, adjacent a first edge of said gear tooth; and means for traversing focused and directed light from said first and second portions of said beam across said gear tooth projecting from said gear from said first edge to a second edge of said gear tooth.

31. A method of hardening a tooth of a gear comprising:

providing two substantially identical high intensity laser beams; and directing said two substantially identical beams simultaneously onto the opposite working surfaces of said tooth to simultaneously harden said tooth without causing back-temper in said working surfaces of said tooth.

* * * * *